United States Patent
Dubay et al.

(10) Patent No.: US 6,748,774 B2
(45) Date of Patent: Jun. 15, 2004

(54) FORWARD FIRING SHAFT LOCK MECHANISM

(75) Inventors: Kurt Daniel Dubay, Merrill, MI (US); Frank Robert Keipert, Bay City, MI (US); Thomas M Glowacki, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/272,055

(22) Filed: Oct. 15, 2002

(65) Prior Publication Data

US 2004/0069025 A1 Apr. 15, 2004

(51) Int. Cl.$^7$ .............................................. B60R 25/02
(52) U.S. Cl. ............................. 70/187; 70/186; 70/252
(58) Field of Search ......................... 70/181–187, 252; 292/DIG. 65

(56) References Cited

U.S. PATENT DOCUMENTS

| | | | | |
|---|---|---|---|---|
| 3,508,625 A | * | 4/1970 | Hawkins | 70/181 |
| 3,596,483 A | * | 8/1971 | Elliott | 70/186 |
| 3,732,710 A | * | 5/1973 | Rhodes et al. | 70/252 |
| 4,750,380 A | * | 6/1988 | Hoblingre et al. | 70/185 |
| 4,903,511 A | | 2/1990 | Niedzielski et al. | |
| 4,991,458 A | * | 2/1991 | Stuedemann | 70/252 |
| 5,415,019 A | * | 5/1995 | Perez | 70/185 |
| 5,454,238 A | | 10/1995 | Ross et al. | |
| 5,718,131 A | * | 2/1998 | Bobbitt, III | 70/184 |
| 5,735,151 A | * | 4/1998 | Nickeas et al. | 70/188 |
| 6,094,951 A | * | 8/2000 | Cusati | 70/184 |
| 6,234,039 B1 | | 5/2001 | Garnault et al. | |
| 6,260,437 B1 | | 7/2001 | Landis | |
| 6,419,269 B1 | | 7/2002 | Manwaring et al. | |

FOREIGN PATENT DOCUMENTS

JP          57191149 A    * 11/1982    ........... B60R/25/02

* cited by examiner

Primary Examiner—Lynne H. Browne
Assistant Examiner—Christopher Boswell
(74) Attorney, Agent, or Firm—Michael D. Smith

(57) ABSTRACT

A steering lock mechanism having an actuator communicating with a lock bolt is provided allowing for more space in the vicinity where a steering wheel is supported by an upper steering shaft. Additionally, a bolt engaging device is supported adjacent a lower end of the upper steering shaft in a position to engage a lock bolt such that any torque forces transmitted through the bolt engaging device will not cause damage to either the device or other components of the steering column. The actuator is rotated about an axis from a first position to a second position to cause the lock bolt communicating with the actuator to advance towards the lower end of the upper steering shaft from a locked position to an unlocked position, respectively.

8 Claims, 3 Drawing Sheets

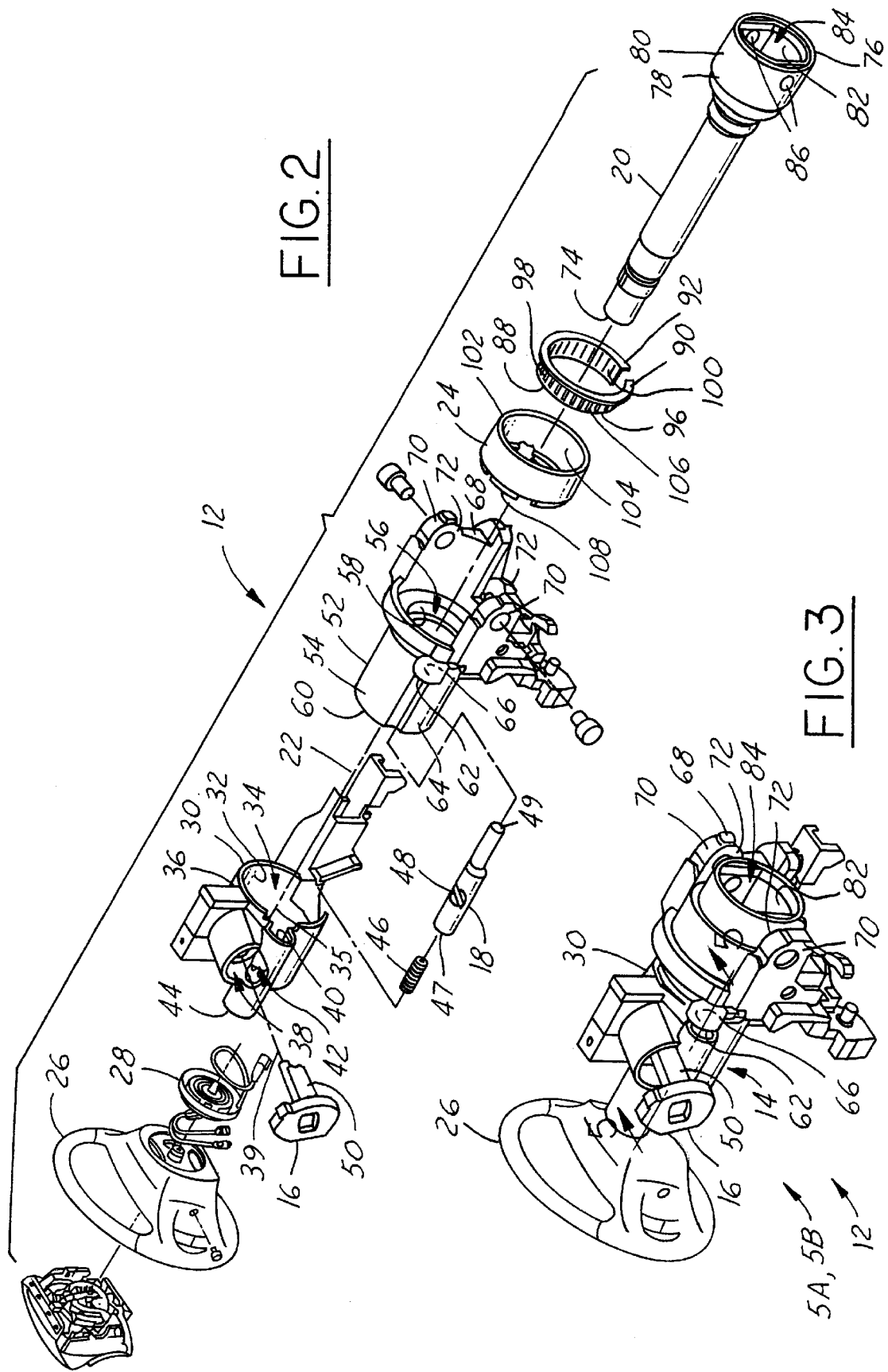

US 6,748,774 B2

FORWARD FIRING SHAFT LOCK MECHANISM

BACKGROUND OF THE INVENTION

1. Field of the Invention

The invention relates generally to automotive steering columns, and more particularly to automotive steering columns having a steering lock mechanism.

2. Related Art

Modern day automobiles typically employ a steering lock mechanism to prevent the steering wheel of the automobile from turning without first rotating the keys in the ignition. Often, such lock mechanisms include a lock plate fixed on the steering shaft via mating splines near the upper end of the shaft and having a plurality of circumferentially spaced locking tabs. A lock bolt actuator, located forward of the lock plate, is operative to position a lock bolt between adjacent tabs to prevent rotation of the lock plate, and thus the steering shaft. Such a system is reliant on the strength of the splines to maintain a locked condition of the wheel under an applied torque load to the steering wheel. If the torque load exceeds the shear strength of the splines, the splines may yield, allowing unwanted rotation of the steering wheel.

Another drawback to the described steering lock mechanism is that the area immediately adjacent the end of the steering shaft, where the lock plate is located, is typically considered "valuable real estate" in that not much area exists for other component parts that are typically located in this area. Today's vehicles typically incorporate supplementary inflation restraint (SIR) systems having components located in this area. As such, the usable space in this area has become more limited for components such as the lock plates described above.

A steering lock mechanism constructed according to the present invention overcomes or greatly minimizes the above limitations of prior steering shaft lock devices.

SUMMARY OF THE INVENTION

A steering lock mechanism for a vehicle has an actuator movable between a first and second position. A lock bolt communicating with the actuator moves between a locked and unlocked position in response to the movement of the actuator between the first and second positions, respectively. A steering shaft rotatable about an axis for steering wheels of the vehicle has an upper end for supporting a hand wheel. A bolt engaging device is supported adjacent a lower end of the steering shaft. The bolt engaging device is in position to engage the lock bolt in response to movement of the lock bolt to the locked position to restrict rotation of the steering shaft about its axis and to disengage of the lock bolt in response to movement of the lock bolt to the unlocked position to restore unrestricted rotation of said steering shaft.

One advantage of this invention is that the lock bolt is located outside of the area considered valuable real estate, thereby reducing congestion in this area to allow the space to be used by other components.

Another advantage of this invention is that torque forces applied through the bolt engagement device will not cause damage between the device and the upper steering shaft.

Another advantage of this invention is that manufacturing costs are reduced and efficiencies are improved by providing a locking mechanism that can be universally applied across a variety of steering column lines.

Another advantage of this invention is that the forces on the components within the steering column are reduced, thus reducing the potential damage to the components.

THE DRAWINGS

These and other features and advantages of the present invention will become more readily appreciated when considered in connection with the following detail description and appended drawings, wherein:

FIG. 2 is an exploded isometric view of a steering column having the subject lock mechanism;

FIG. 3 is an assembled view of the steering column of FIG. 2;

DETAILED DESCRIPTION OF A PREFERRED EMBODIMENT

Figure 1:
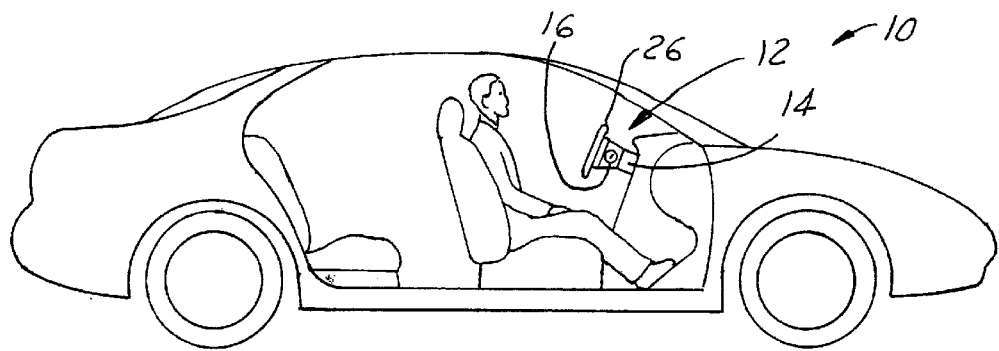
FIG. 1 shows a vehicle having a steering lock mechanism according to a presently preferred embodiment of the invention.
Figure 5A:
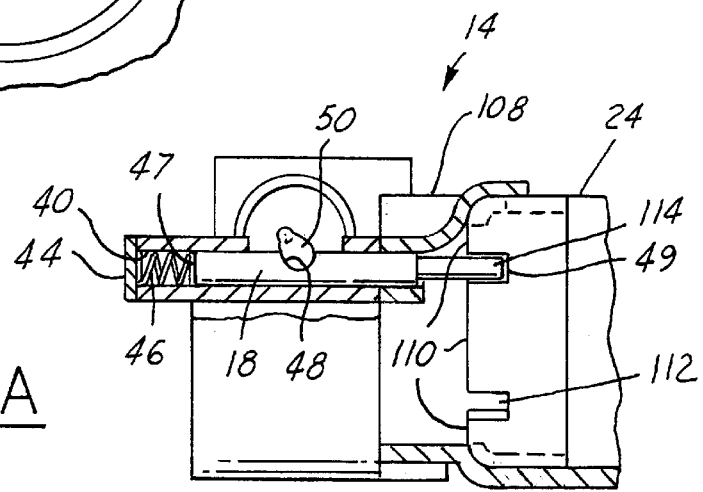
FIG. 5A is a fragmentary sectional elevation view taken generally along lines 5—5 in FIG. 3, with the lock bolt in the locked position.
Figure 5B:
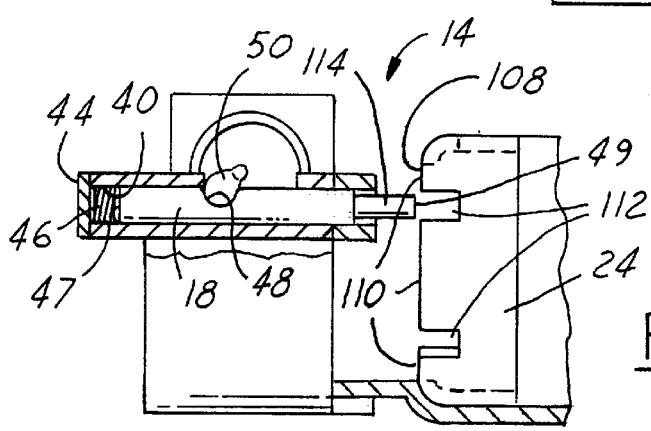
FIG. 5B is a view like FIG. 5A, but showing the lock bolt in an unlocked position.

FIG. 1 shows a vehicle 10 having a steering column 12 fitted with a steering lock mechanism 14 constructed according to a presently preferred embodiment of the invention. As shown in FIG. 2, the steering lock mechanism 14 has an actuator 16 communicating with a lock bolt 18 for operative engagement of the lock bolt 18 between a locked and unlocked position. While in the locked position, as best shown in FIG. 5A, the lock bolt 18 prevents an upper steering shaft 20 from rotating about an axis 22 to prevent steering the wheels of the vehicle. A bolt engaging device 24 is supported by the upper steering shaft 20 in a position to engage the lock bolt 18 and to restrict rotation of the upper steering shaft 20 about its axis 22. The lock bolt 18 can be moved or disengaged to an unlocked position, as best shown in FIG. 5B, to restore unrestricted rotation of the upper steering shaft 20 about its axis 22. The location of the steering lock mechanism 14, and particularly the bolt engaging device 24, provides for space adjacent the steering wheel 26 so that inflationary mechanisms 28 such as an airbag and the components required to inflate the airbag can be positioned within the space necessary adjacent the steering wheel 26.

As shown in FIGS. 2 and 3, the steering column 12 has a lock housing 30, preferably made of plastic or a polymer material, shown to be generally cylindrical in shape. The lock housing 30 has an inner wall 32 defining an opening 34 having a longitudinal axis 35 to receive the upper steering shaft 20 and an outer wall 36. The outer wall 36 forms a passage 38 preferably cylindrical in shape and having an axis 39 perpendicular to the longitudinal axis 35 in the lock housing 30 to receive the actuator 16. Preferably, the inner wall 32 of the lock housing 30 has a recessed channel 40 running the length of the lock housing 30 and generally parallel to the longitudinal axis 35 of the lock housing 30 such that the passage 38 and the recessed channel 40 communicate via an opening 42 therebetween. The recessed channel 40 preferably has an end wall 44 on an end of the channel 40 proximate the steering wheel 26.

A lock bolt spring 46, having a predefined spring constant, and lock bolt 18 are received in the recessed channel 40 of the lock housing 30 such that the lock bolt spring 46 communicates with the lock bolt 18 by abutting an end 47 of the lock bolt 18. The lock bolt spring 46 engages the end wall 44 in the recessed channel 40 and the end 47 of the lock bolt 18, biasing the lock bolt 18 toward the forward portion of the vehicle (a forward direction indicates a direction toward the front end of the vehicle while a rearward direction refers to a direction toward the rear end of the vehicle). The lock bolt 18 preferably has a notched portion 48 between the ends 47, 49 of the lock bolt 18 positioned to receive a portion of the actuator 16. The lock bolt 18 is preferably made of steel and of sufficient strength to withstand sheer forces that would tend to rotate the shaft 20 about its axis while in the locked position.

Figure 4:
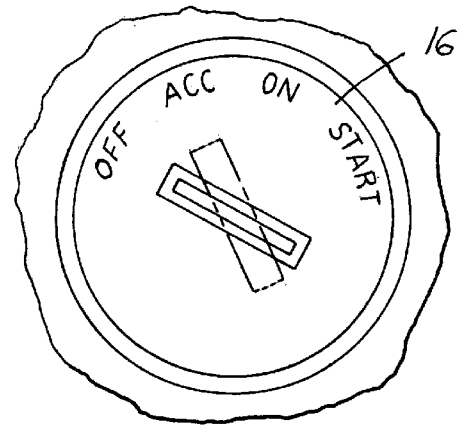
FIG. 4 is a side view of an actuator in a first and second position.

The actuator 16, shown here as a key bolt, is disposed in the passage 38 formed in the outer wall 36 of the lock housing 30. The actuator 16 has a lever portion 50 that is received in the notched portion 48 of the lock bolt 18, such that movement of the lever portion 50 causes movement of the lock bolt 18 between its locked and unlocked positions. As best shown in FIG. 4, the actuator 16 has a first solid line position shown here as an "off" position, and second phantom line position. When in the first position, the lock bolt 18 is disposed in its locked position, and when in the second position, the lock bolt 18 is moved to its unlocked position.

Figure 6:
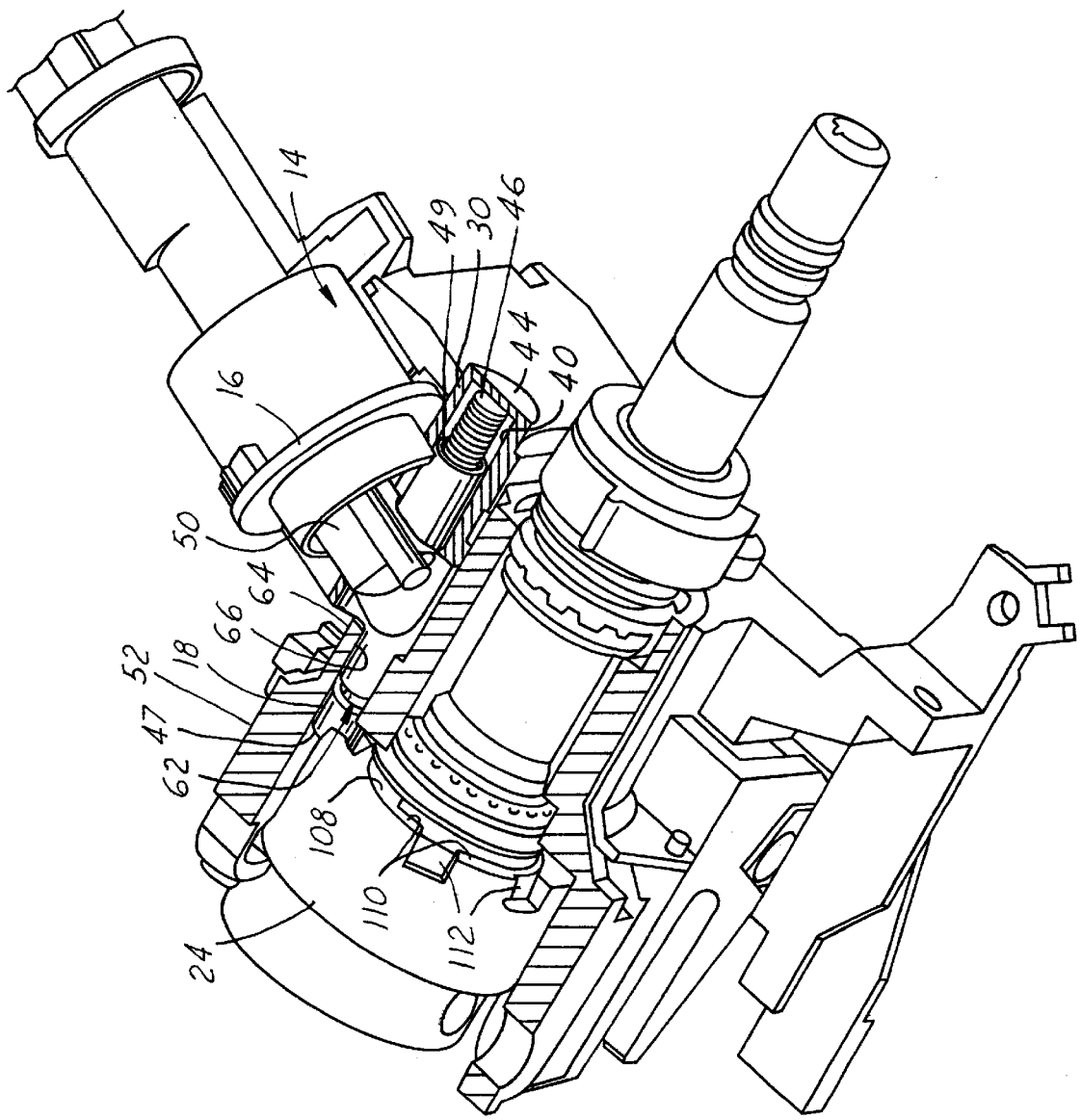
FIG. 6 is a partially sectioned isometric view of the column showing the lock bolt in the locked position.

As best shown in FIGS. 2 and 3, a tilt housing 52, preferably made of a metallic material such as aluminum or steel, has a generally cylindrical wall 54 and has a through passage 56 defined by an inner surface 58 of the wall 54 through which the upper steering shaft 20 is received. A rearward end 60 of the tilt housing 52 is shaped for telescoping receipt within the lock housing 30. As best shown in FIG. 6, when the lock housing 30 is received about the tilt housing 52, the recessed channel 40 in the lock housing 30 aligns with a through hole 62 of the tilt housing 52. The aligned channel 40 and through hole 62 allow the lock bolt 18 to pass through the through hole 62 during movement between the locked and unlocked positions. When the lock bolt 18 is in the locked position, and a torque is applied to the upper steering shaft 20 via the steering wheel 26, the lock bolt 18 forcefully engages a surface 66 of the through hole 62 in the tilt housing 52, thus allowing the tilt housing 52 to carry a majority of the torsional force to prevent rotation of the upper steering shaft 26. By taking on a majority of the torsional force, the tilt housing isolates other steering column components associated with the lock bolt 18 from heavy torque loading.

A forward portion 68 of the tilt housing 52 has a pair of laterally opposed pin bosses 70 pivotally mountable to a forward portion of the steering column assembly (not shown) to enable pivotal movement of the upper steering shaft 20. The pin bosses 70 have inner walls 72 spaced from one another to accommodate rotation of the bolt engaging device 24 within the tilt housing 52.

The upper steering shaft 20 has an upper end 74 disposed adjacent the actuator 16 on which the steering wheel 26 is mounted, and a lower end 76, which is configured for connection with a lower steering mechanism (not shown) of the vehicle 10. The lower end 76 has a bell-shaped wall 78 with an outer surface 80 and an inner surface 82. The inner surface 82 defines a cavity 84 with apertures 86 extending through the wall 78 for accommodating pins (not shown) for articulated connection with a lower steering shaft (not shown). Upon assembly of the upper steering shaft 20 with the tilt housing 52, the apertures 86 align with the pin bosses 70 in the tilt housing 52.

As shown in FIG. 2, a tolerance ring 88 is received on the outer surface 80 of the lower end 76 of the upper steering shaft 20. One end 90 of the tolerance ring 88 has a lip 92 extending radially outwardly from an outer surface 94 of the tolerance ring 88 and is positioned on the upper steering shaft 20 such that the lip 92 faces in a forward direction, while another end 96 of the tolerance ring 88 faces in a rearward direction. The tolerance ring 88 has a plurality of scalloped protrusions 98 that extend radially outwardly and extend generally along the direction of the steering shaft axis 22 upon assembly. An inner surface 100 of the tolerance ring 88 is sized to mate with the outer surface 80 of the lower end 76 of the upper steering shaft 20 such that the tolerance ring 88 rotates with the upper steering shaft 80 until a torque differential between the tolerance ring 88 and upper steering shaft 20 of 100 N–m or greater is present. When a torque differential of 100 N–m or greater exists between the tolerance ring 88 and the upper steering shaft 20, the shaft 20 can rotate relative to the tolerance ring 88. Therefore, in order for a user to operate and steer the vehicle 10 when the lock bolt 18 is in its locked position, the user must apply a constant 100 N–m torque or greater to the upper steering shaft 20 to steer the wheels of the vehicle 10.

As best shown in FIGS. 2–4, the bolt engaging device 24 has a generally cup-shaped body and is sized to mate with the tolerance ring 88 adjacent the lower end 76 of the upper steering shaft 20. The device 24 has a free end 102 that fits over and mates with the tolerance ring 88, such that the free end 102 abuts or fits adjacent to the lip 92 on the tolerance ring 88. An inner surface 104 of the device 24 is sized to mate with an outer surface 106 of the scalloped protrusions 98 of the tolerance ring 88 to provide for the break-away torque of 100 N–m. The opposite end 108 of the bolt engagement device 24 is formed with a plurality of radially inwardly extending tabs 110, which are spaced circumferentially to provide a plurality of associated spaces 112 between the tabs 110. The spaces 112 are spaced generally equidistant from one another around the circumference of the device 24 and are sized to receive at least a portion 114 of the lock bolt 18 while the lock bolt 18 is in its locked position.

In operation, while the actuator 16 is in its first position, the lock bolt 18 is in its locked position. Thus, the lock bolt 18 is biased by the lock bolt spring 46 extended in a forward direction and toward the lower end 76 of the upper steering shaft 20. The lock bolt 18, while in its locked position, is received between the tabs 110 and within the spaces 112 of the bolt engaging device 24 to restrict rotation of the upper steering shaft 20 about its axis 22, and thus prevents a user from turning the steering wheel 26. If the upper steering shaft 20 has a torque less than 100 N–m applied to the upper steering shaft 20 via the steering wheel 26 while the lock bolt 18 is received between the tabs 110 of the bolt engagement device 24, the tabs 110 on the device 24 will engage the lock bolt 18. Thus, the upper steering shaft 20 and steering wheel 26 will be prevented from rotating about their axes as a result of the lock bolt 18 engaging the device 24 and being prevented from rotating about the steering shaft axis 22 by the tilt housing 52.

If however, when the lock bolt 18 is engaged in the bolt engaging device 24 and a torque of 100 N–m or greater is applied to the upper steering shaft 20, then the upper steering shaft 20 will be permitted to rotate relative to the device 24 as a result of the tolerance ring 88 operating as a slip clutch. The engagement of the lock bolt 18 with the tilt housing 52 prevents the lock bolt 18 from applying a load to other components within the steering column 12, and thus helps to extend the useful life of other components in the steering column 12 and particularly those components associated with the actuator 16.

When a user desires to drive the vehicle 10, the user can insert a key into the actuator 16 to rotate the actuator 16 in a clockwise direction to its second position, as shown in phantom in FIG. 4, thus causing the lock bolt 18 to move in a rearward direction to its unlocked position to disengage the lock bolt 18 from the bolt engaging device 24. As the lock bolt 18 disengages from the device 24, the lock bolt 18 traverses through the through hole 62 in the tilt housing 52 toward the upper end 74 of the upper steering shaft 20 and compresses the spring 46. While the lock bolt 18 is disengaged from the bolt engaging device 24, the user of the vehicle 10 is free to rotate the steering wheel 26 about its axis to turn the wheels of the vehicle 10.

This arrangement of the steering lock mechanism 14 provides space adjacent the upper end 74 of the upper steering shaft 20 for inflationary mechanisms 28, such as an airbag and its components that are typically located adjacent the steering wheel 26. In particular, having a bolt engaging device 24 adjacent the lower end 76 of the upper steering shaft 20 and being spaced sufficiently from the upper end 74 of the upper steering shaft 20 prevents interference between the steering lock mechanism 14 and any inflationary mechanisms 28. Additionally, having a lock bolt 18 that moves in a forward direction to engage the bolt engaging device 24 provides for space adjacent the upper end 74 of the upper steering shaft 20, while also minimizing any interference with inflationary mechanisms 28.

Obviously, many modifications and variations of the present invention are possible in light of the above teachings. It is, therefore, to be understood that within the scope of the appended claims, the invention may be practiced otherwise than as specifically described, as the embodiment described above is only a presently preferred embodiment of the invention. The invention is defined by the claims.

What is claimed is:

1. A steering lock mechanism for a vehicle, comprising:
   a steering shaft supported for rotation about a longitudinal axis of said shaft and having an upper end for supporting a hand wheel and extending forwardly therefrom to an opposite lower end;
   a bolt engaging device mounted on said steering shaft adjacent said lower end of said shaft and fixed against axial movement relative to said shaft;
   an actuator moveable between a first position and a second position; and
   a lock bolt disposed between said upper and lower ends of said shaft and moveable in response to movement of said actuator axially of said shaft to an unlocked position toward said upper end of said shaft and out of locking engagement with said bolt engaging device, and a locked position displaced axially forward of said unlocked position toward said lower end of said shaft and disposed in locking engagement with said bolt engaging device to restrict rotational movement of said steering shaft about said axis.

2. The mechanism of claim 1 including a tolerance ring disposed between said bolt engaging device and said steering shaft and operative to enable rotation of said shaft relative to said bolt engaging device in response to application of a torque load on said shaft exceeding a predetermined threshold value.

3. The mechanism of claim 2 wherein said threshold value is at least 100 N–m.

4. The mechanism of claim 3 wherein an inner surface of said tolerance ring includes a plurality of scalloped protrusions.

5. The mechanism of claim 1 wherein said bolt engaging device comprises a lock collar disposed on said lower end of said shaft and formed with a plurality of circumferentially spaced detents open toward said upper end of said shaft.

6. The mechanism of claim 5 wherein said detents comprise a plurality of open slots.

7. The mechanism of claim 1 including a spring biasing said lock bolt toward said locked position.

8. The mechanism of claim 1 including an inflationary mechanism disposed adjacent said upper end of said shaft and wherein said lock bolt and said bolt engaging device are spaced from said inflationary device.

* * * * *